United States Patent [19]

Funaki et al.

[11] 4,310,330

[45] Jan. 12, 1982

[54] METHOD FOR THE MANUFACTURE OF A COLORED NONFOGGING ARTICLE

[75] Inventors: Masaaki Funaki, Toyonaka; Motoaki Yoshida, Nishinomiya; Haruo Inatomi, Amagasaki; Ryozo Kuriyama, Ibaraki; Taizo Oshima, Tondabayashi, all of Japan

[73] Assignees: Nippon Sheet Glass Co., Ltd.; Sumitomo Chemical Company, Limited, both of Osaka, Japan

[21] Appl. No.: 160,549

[22] Filed: Jun. 18, 1980

[30] Foreign Application Priority Data

Jun. 21, 1979 [JP] Japan ................... 54-77525

[51] Int. Cl.³ .................. D06P 3/04; D06P 3/58; D06P 3/02; D06P 3/00
[52] U.S. Cl. ........................... 8/506; 8/509; 8/516; 8/518
[58] Field of Search ............ 8/506, 508, 509, 510, 8/511, 512, 513, 514, 515, 516, 517, 518, 519, 520

[56] References Cited

U.S. PATENT DOCUMENTS 3,514,246  5/1970  Bianco et al. ................... 8/506
3,561,911  2/1971  Fuhr et al. ..................... 8/519

FOREIGN PATENT DOCUMENTS 573522  10/1977  U.S.S.R. ....................... 8/509

Primary Examiner—Maria Parrish Tungol
Attorney, Agent, or Firm—Gordon W. Hueschen

[57] ABSTRACT

A method for the manufacture of a colored nonfogging article, which comprises bringing a nonfogging substrate containing a surfactant into contact with a dyeing solution containing a surfactant, a solvent and a coloring material, said surfactant being contained in the dyeing solution in an amount within the range of 20 to 100% by weight based on the total amount of the surfactant and the solvent.

20 Claims, No Drawings

METHOD FOR THE MANUFACTURE OF A COLORED NONFOGGING ARTICLE

This invention relates to a method for the manufacture of a nonfogging article colored without impairing the nonfogging property thereof.

Shaped articles made of plastic materials and glass are serving a wide variety of uses. They, however, have suffered the disadvantage that small deposits of water form on their surfaces and eventually deprive them of their transparency when their surface temperature is allowed to fall below the prevalent dew point of the ambient air. Various solutions have been suggested to overcome this disadvantage, e.g., to preclude the phenomenon of fogging by applying a hydrophilic nonfogging coating to the articles and to enhance the non-fogging property of the articles by blending a surface active agent ("surfactant" for short) into the coating. Some of these inventions have already been embodied in eyeglasses for correction of vision defects, sunglasses, ski goggles, goggles for plant workers, looking glass, etc. Today in the market, a technique capable of imparting colors to shaped articles of plastic materials and glass is strongly in demand. To date, no method has been developed which effectively imparts colors uniformly to these shaped articles without entailing exudation of the surfactant from the nonfogging coating, namely without sacrificing the nonfogging property of the coating.

Of the methods heretofore developed for the manufacture of colored nonfogging articles, those which have won wide recognition are as follows.

(1) A method which produces a colored nonfogging article by suitably dispersing or dissolving a coloring material is a composition prepared in advance by blending a surfactant into a nonfogging resin before subjecting the composition to a polymerization, polycondensation or crosslinking reaction, applying a coating of the composition to a given substrate, and thereafter subjecting the coating to the polymerization, polycondensation or crosslinking reaction thereby setting the nonfogging colored coating fast on the substrate.

(2) A method which produces a colored nonfogging article by applying to a given substrate a coating of a resin having a surfactant blended therein in advance, subjecting the coating to a polymerization, polycondensation or crosslinking reaction, and applying a solution prepared by dissolving a suitable coloring material in a solvent to the substrate now having a nonfogging coating formed on its surface thereby allowing the solution to permeate and color the coating, giving rise to a product containing a colored nonfogging coating.

By the method of (1), since the thickness of the coating directly determines the shade of color, no uniform distribution of color is obtianed when the thickness of the coating lacks uniformity. Nor, is it possible to obtain by this method, desired color gradation by partial application of coloring material to the substrate. By the method of (2), since the coating is immersed in a suitable solvent at the time of the coloration the surfactant initially blended into the coating for improving the nonfogging property thereof dissolves out into the solvent during the treatment of coloration and the nonfogging coating is consequently deprived of its nonfogging property even to a point where the product finally obtained will have no commercial value at all. These methods, therefore, fall short of satisfying the demand.

An object of this invention, therefore, is to provide a method for the manufacture of colored nonfogging articles.

Another object of this invention is to provide an improved method for the manufacture of nonfogging articles which have been colored without impairing the nonfogging property thereof.

These objects of the present invention are attained by a method which produces a colored nonfogging article by bringing a nonfogging substrate containing a surfactant into contact with a dyeing solution containing a surfactant, a solvent and a coloring material, said surfactant being in the amount of 20 to 100% by weight based on the total amount of the surfactant and the solvent.

According to the conventional method which effects coloration of a nonfogging substrate by exposing the substrate to direct contact with a dyeing solution composed of a coloring material and a solvent, the surfactant contained in the nonfogging substrate is exudated by the solvent and the content of the surfactant in the surface region of the nonfogging substrate is lowered. As a result, the nonfogging article suffers loss of its nonfogging property. According to the present invention, coloration of the surface of a nonfogging substrate is accomplished by exposing the surface of the article to direct contact with a dyeing solution containing a surfactant in a large amount, specifically an amount of 20 to 100% by weight based on the total amount of the surfactant and the solvent. Thus, the decrease in the content of surfactant in the surface region of the nonfogging substrate, a phenomenon attendant upon the conventional method, can be precluded. The product finally obtained, therefore, will retain unimpaired the nonfogging property of the substrate.

So far as the amount of the surfactant in the dyeing solution is maintained within the range of 20 to 100% by weight based on the total amount of the surfactant and the solvent, the content of the surfactant in the surface region of the non-fogging substrate is hardly decreased for reasons not known definitely. One possible reason may be that the surfactant present in the dyeing solution gathers in the interface between the nonfogging substrate and the dyeing solution and, consequently, the surfactant distributed in the surface region of the non-fogging substrate is prevented from passing through the interface into the dyeing solution. Preferably, the amount of the surfactant contained in the dyeing solution falls in the range of 50 to 100% by weight based on the total amount of the surfactant and the solvent.

The solvent contained in the dyeing solution is intended to dissolve or disperse the coloring material added thereto in the form of powder. Where the surfactant contained in the dyeing solution is capable of thoroughly dissolving or dispersing the coloring material, the dyeing solution finds no use for the solvent. The combination of a surfactant and a coloring material soluble or dispersible in the surfactant can easily be selected. Examples of the combinations which are available herein include those of a dialkyl-sulfosuccinate type anionic surfactant and an anthraquinone type disperse dye, a polyoxyethylene-alkylamide type nonionic surfactant and a quinophthalone type disperse dye, and an alkyl-methyltauride type anionic surfactant and a diazo type disperse dye.

When none of the aforementioned combiantions of surfactants and coloring materials soluble or dispersible in the respective surfactants is selected, the dyeing solution necessitates inclusion of a solvent. In the dyeing solution, the solvent can be contained in an amount of less than 80% by weight based on the total amount of the surfactant and the solvent. For the purpose of enabling the colored nonfogging articles, the final product, to retain its nonfogging property intact, the amount of the solvent contained in the dyeing solution is expected to be decreased to the minimum necessary for obtaining desired dissolution or dispersion of the coloring material (and, accordingly, the amount of the surfactant in the solution to be increased proportionately). Examples of the solvents usable in the dyeing solution include water, various alcohols and acetone. Use of a solvent which causes heavy corrosion of the surface of the nonfogging substrate during the treatment of coloration is undesirable. Water is used most advantageously as a solvent which is available most readily and has no possibility of corroding the nonfogging substrate. The solvent such as water may additionally incorporate a small amount of alcohol or acetone or some other substance useful as a coloring aid.

For includion in the dyeing solution and the nonfogging substrate to be used for the purpose of this invention, there can be selected any of the anionic, nonionic, cationic and amphoteric surfactants. The surfactant thus contained in the dyeing solution is desired to be capable of dissolving or dispersing the coloring material. The surfactant to be contained in the nonfogging substrate and that to be contained in the dyeing solution may be of a kind or of different kinds. In the dyeing solution, most coloring materials available for the coloration of nonfogging substrates are liable to become unstable in an alkaline state. The cationic surfactant which alkalinizes the dyeing solution can effectively be used in the solution in combination with a coloring material which is stable in an alkaline state. It is, however, desirable to avoid using the surfactant in combination with a coloring material which is unstable in an alkaline state.

Examples of the anionic surfactants which are advantageously used in this invention include those of straight-chain alkylbenzene sodium sulfonate type

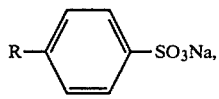

alcohol-sulfate type R-OSO$_3$Na, polyoxyethylenealkyl ether sulfate type R—O$(CH_2CH_2O)_n$SO$_3$Na, polyoxy-ethylenealkylphenyl ether sulfate type

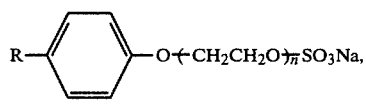

alkylmethyl tauride type

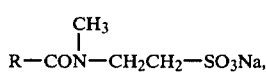

α-olefin sulfonate type RCH=CH(CH$_2$)$_n$SO$_3$Na, dialkyl sulfosuccinate type

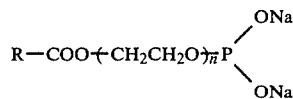

polyoxyethylene carboxylic ester sulfate type R—COO$(CH_2CH_2O)_n$SO$_3$Na, polyoxyethylene carboxylic ester phosphate type

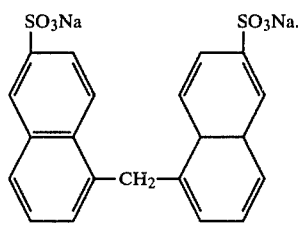

and β-naphthalene sulfonic acid-formaldehyde polycondensate type

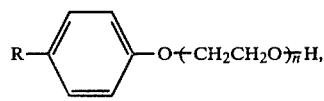

Examples of the nonionic surfactants which are advantageously used herein include those of polyoxyethylene alkyl ether type R—O$(CH_2CH_2O)_n$H, polyoxyethylene alkylaryl ether type

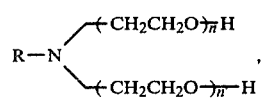

polyoxyethylene alkyl amine type R—NH$(CH_2CH_2O)_n$H and

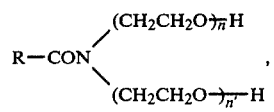

polyoxyethylene alkyl amide type R$(CONH—CH_2CH_2O)_n$H and

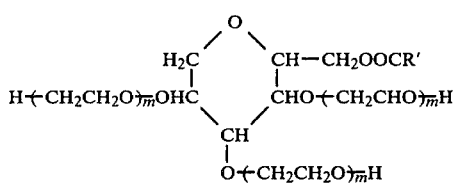

polyoxyethylene sorbitan fatty ester type $$\underset{H(CH_2CH_2O)_{\overline{m}}OHC}{\overset{H_2C}{\underset{\underset{O(CH_2CH_2O)_{\overline{m}}H}{CH}}{\bigg\langle}}}\overset{O}{\underset{CHO(CH_2CHO)_{\overline{m}}H}{\overset{CH-CH_2OOCR'}{\bigg\rangle}}}$$

(wherein, R' represents an alkyl having 6 to 25 carbon atoms and m an integer having the value of 5 to 50), Pluronic type HO$(CH_2CH_2O)_{\overline{a}}(CH_3CHC-H_2O)_{\overline{b}}(CH_2CH_2O)_{\overline{c}}$H (wherein, a, b and c each have a vlaue greater than 1 and the sum of a, b and c has a value of 20 to 300), the Tetronic type

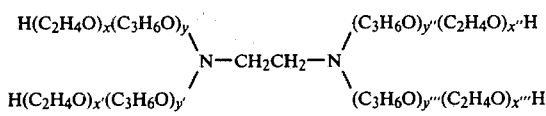

(wherein, X through X''' each have a value greater than 1, Y through Y''' each have a value greater than 1 and the sum of X, X', X'', X''', Y, Y', Y'' and Y''' has a vlaue of 20 to 600).

Examples of the cationic surfactants which are advantageously used herein include those of primary amine salt R—NH$_2$.HCl, secondary amine salt

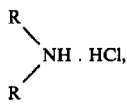

tertiary amine salt

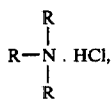

imidazole salt

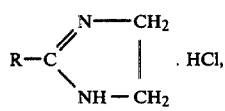

and alkyl quaternary ammonium salt

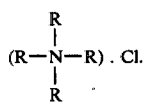

Examples of amphoteric surfactants which are advantageously used herein include those of betaine type

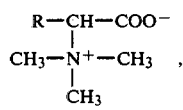

glycine type R-NH-CH$_2$-COOH, alanine type R—NH—CH$_2$—CH$_2$—COOH and sulfobetaine type R$_1$—NH—R$_2$—SO$_3$H. It is provided that in the general formulas given above, R and R$_1$ each represent an alkyl group having 6 to 25 carbon atoms, R$_2$ an alkylene group having 1 to 5 carbon atoms, and n and n' each represent an integer having the value of 2 to 50, preferably 5 to 30. The surfactants in each grouping may be used individually, or in the form of a mixture of two or more members.

In the present invention, the amount of the surfactant to be contained in the nonfogging substrate is within the range of 1 to 40% by weight, preferably 3 to 20% by weight, based on the amount of the hydrophilic or hydrophobic resin solids forming the substrate. When the nonfogging substrate in which the surfactant is to be contained is made of a hydrophilic resin which will be described more specifically afterward, the surfactant is desired to be selected from the group consisting of nonionic surfactants, preferably including those of polyoxyethylene types such as polyoxyethylene alkyl ether type, polyoxyethylene alkyl aryl ether type, polyoxyethylene alkyl amide type and polyoxyethylene sorbitan fatty ester type.

For the coloration of articles according to this invention, any of the substances which pass as dyes may be used without any restriction. Specifically, azo type and anthraquinone type disperse dyes, disperse reactive dyes and other naphthol dyes such as are indicated in Japanese Published Unexamined Patent Application Nos. 187/1975, 14,887/1975 111,382/1975 and 111,383/1975 are preferred examples.

The amount of the coloring material to be contained in the dyeing solution is desired to be not less than 0.01% by weight, preferably 0.1% by weight, based on the total amount of the surfactant and the solvent present. When the amount of the coloring material is less than 0.01% by weight, the speed of coloration is lower and the time required for the produced color to reach a prescribed shade is longer than are normally expected and, worse still, uneven coloring tends to occur in the form of scattered spots on the surface of the colored nonfogging substrate. When the concentration of the coloring material excessively increases, the coloring material is dissolved or dispersed in the solvent or the surfactant with increased difficulty. Thus, the amount is required to be not more than 50% by weight based on the total amount mentioned above. Where the treatment of dyeing is performed by the so-called dye-bath method, i.e., the method whereby the dyeing is effected by filling a coloring tank with the dyeing solution and immersing in the bath the nonfogging substrate subjected to coloration, if the concentration of the coloring material is excessively high, the coloring material tends to collect on the bottom of the dyeing bath and possibly pose an operational problem and, at the same time, uneven coloring tends to occur on the substrate immersed in the dyeing bath. Thus, the amount of the coloring material in the dyeing solution used for the dye-bath method is desired to be not more than 20% by weight based on the aforementioned total amount.

When the amount of the surfactant contained in the dyeing solution exceeds 20% by weight based on the total amount of the surfactant and the solvent as contemplated by the present invention, the amount of the coloring material required to be contained in the dyeing solution is several times greater than when the dyeing solution contains absolutely no surfactant or when it contains only a very small amount (normally on the order of less than 1% by weight) of surfactant as a dispersion aid for the coloring material, providing that the dyeing treatment is performed to obtain a fixed shade of color under fixed dyeing conditions. This fact claims special attention.

When the dyeing treatment is performed at an excessively low temperature, the time required for the produced color to reach a prescribed shade is lengthened. When the temperature of the treatment is too high, the vapor issuing from the dyeing solution renders the dyeing work difficult and possibly causes corrosion of the surface of the nonfogging substrate. Thus, the dyeing treatment is desired to be performed at temperatures within the range of 40° to 130° C., preferably 70° to 95° C. The length of the dyeing treatment is variable with various factors such as the kind and concentration of coloring material, the kind of nonfogging substrate, the desired shade of color and the temperature of dyeing treatment. Generally, it is within the range of 10 seconds to one hour, desirably 1 to 20 minutes, and preferably 2 to 10 minutes.

Where the nonfogging substrate subjected to coloration possesses transparency, the dyeing treatment is desired to be carried out to an extent such that the shade of the color produced on the treated substrate still permits at least part of the surface of the nonfogging substrate to retain the transparency.

Examples of the methods which are effectively used in this invention for the purpose of establishing contact between the nonfogging substrate containing the surfactant and the dyeing solution include the aforementioned dye-bath method and other ordinary dyeing methods including the spray method and the printing method. Otherwise, the desired contact may be obtained by allowing a layer or film of the dyeing solution having a fixed or controlled thickness distribution to be formed on the whole or part of the surface of the nonfogging substrate.

The expression "nonfogging substrate containing a surfactant" as used in the present invention refers to an article of plastic material or glass which has its surface coated with a film made of a nonfogging resin (either a resin which inherently exhibits a nonfogging property without requiring any surfactant or a resin which inherently lacks a nonfogging property and yet acquires this property upon inclusion of a surfactant) containing a surfactant. Examples of such nonfogging substrates include eyeglasses for correction of vision defects, sunglasses, ski goggles, looking glass, windowpanes, automobile windows, films, plates and other shaped articles made of the aforementioned nonfogging resin containing a surfactant such as, for example, contact lenses. In view of the objects of this invention, these substrates are desired to possess transparency. Where circumstances require, they may be opaque or translucent.

Examples of substrates coated with a nonfogging resin containing a surfactant include articles of plastic materials and glass which are coated with paints obtained by blending surfactants such as, for example, polyoxyethylene type nonionic surfactants into natural or synthetic resins including hydrophilic resins such as polyol-modified melamine resin, hydrophilic acrylate polymer, hydrophilic methacrylate polymer polyvinyl alcohol, polyacetal, polyacrylamide, polymethacrylamide, polyvinyl pyrrolidone, polyethylene oxide, polyethylene imine and hydroxyl cellulose and hydrophobic resins such as diethylene glycol bisallyl carbonate resin. Other examples of nonfogging substrates containing a surfactant include various shaped articles made of mixtures which are obtained by blending surfactants into the aforementioned hydrophilic or hydrophobic resins.

Examples of materials for the articles of plastics and glass which are subjected to the aforementioned coating treatment are plastics such as cellulosic plastics, polycarbonate type plastics including diethylene glycol bisallyl carbonate, polyacrylic plastics, polyvinyl chloride type plastics, polystyrene type plastics and polyester type plastics, and natural or synthetic organic or inorganic substances such as inorganic glass. Although these materials may be transparent or opaque, those possessed of transparency are more advantageously used in view of the objects of the invention.

The treatment of the article by use of the aforementioned resin which by nature is capable of imparting the nonfogging property may be accomplished, for example, by diluting the resin with some suitable solvent, then adding to the diluted resin the surfactant, crosslinking agent, polymerization initiator, catalyst and flow controlling agent, applying the resultant mixture to the surface of the substrate and exposing the applied coat of the mixture to heat, ultraviolet rays or gamma rays.

Specifically as hydrophilic resins suitable for use in the treatment mentioned above, polyol-modified melamine resins are most desirable. They are mixtures or prepolycondensates of methylol melamines having partially or wholly alkyl-etherified methylol groups such as for example, hexamethoxymethyl melamine, hexamethylol melamine pentamethyl ether, pentamethylol melamine pentamethyl ether, tetramethylol melamine tetramethyl ether and trimethylol melamine trimethyl ether with polyhydric alcohols such as diethylene glycol, triethylene glycol, glycerine and sorbitol which are obtained by addition of one to five ethylene oxides to the individual hydroxyl groups and are possessed of ethylene oxide chains having a molecular weight of 100 to 2,000. Examples of hydrophilic acrylate or methacrylate polymers are polymers of hydroxy lower alkyl acrylates, hydroxy lower alkyl methacrylates, hydroxy lower alkoxy lower alkyl acrylates and hydroxy lower alkoxy lower alkyl methacrylates represented by 2-hydroxyethyl acrylate, 2-hydroxyethyl methacrylate, diethylene glycol monoacrylate and diethylene glycol monomethyacrylate. As a polyvinyl alcohol, there may be used either wholly saponified polyvinyl acetate or partially saponified polyvinyl acetate. Other examples include polyvinyl acetals such as polyvinyl formal, polyvinyl acetacetal and polyvinyl butyral, and poly(meth)acrylamides such as polyacrylamide, polymethacrylamide, polymethylol acrylamide, polydiacetone acrylamide and polymethylol methacrylamide.

The method of the present invention brings about the following outstanding effects:

(1) Uniformity of coloring
(2) Partial coloration, i.e. gradation of coloring
(3) The nonfogging property acquired by the article owing to the incorporation of surfactant can be retained in its initial state without being degraded to even the slightest extent.
(4) The method of this invention is very simple from the operational point of view and suits small-lot dyeing treatments involving a rich variety of end products.

Thus, it meets the needs of the market.

Now, the invention will be described specifically with reference to the working examples cited below.

In these examples, the nonfogging property was determined (before and after the dyeing treatment) by the exhalation test which comprised the steps of holding a given sample at $-10°$ C., removing the sample into a constant-temperature room at 25° C., blowing the breath against the sample and examining the sample to determine whether the breath caused fogging of the sample. In conjunction with this test, there was carried out a wetting test which comprised the steps of keeping a given sample in running water for 10 minutes, then exposing it to the steam rising from hot water at 90° to 95° C. and examining it to rate the degree of wetting on the A-B-C scale, wherein A stands for complete surface wetting, B for sparse deposition of large water drops and C for dense deposition of minute water drops.

EXAMPLE 1

To the opposite surfaces of a circular plate substrate 4 mm thick and 72 mm across prepared by polymerizing diethylene glycol bisallyl carbonte (PPG Industries' product marketed under trademark designation CR-39), a point obtained by dissolving in 330 g of ethyl Cellosolve 50 g of 2-hydroxyethyl methacrylate polymer (molecular weight about 50,000) and 65 g of prepolymer (molecular weight about 3,000) formed of 40 g of hexakis-methoxymethyl melamine with 27 g of 1,4-butane diol and adding thereto 0.2 g of ammonium thiocyanate as a catalyst was applied. The paint thus applied was set by heating at a temperature of 100° C. for 20 minutes to produce an undercoat layer. To the undercoat layer was applied a paint which was prepared by dissolving 100 g of a prepolymer (molecular weight about 3,000) formed of 65 g of hexamethoxymethyl melamine and 141 g of polyoxyethylated sorbitol of a molecular weight of 850, together with 1 g of ammonium nitrate as a catalyst and 10 g of a polyoxyethylene alkyl ether type surfactant (Asahi Denka's product marketed under trademark designation Adekanol LO-9), in a mixed solvent consisting of 40 g of butyl Cellosolve and 20 g of water. The applied paint was heated at a temperature of 130° C. for 60 minutes, to produce a nonfogging film. The article of CR-39 coated with the nonfogging film as described above was kept at 90° C. for five minutes in a dyeing bath composed of 90 g of a dialkylsulfosuccinate type anionic surfactant (Daiichi Kogyo Seiyaku's product containing 72% of principal component and marketed under trademark designation Neocole YSK), 10 g of water and 5 g of an anthraquinone type disperse dye (Sumitomo Chemical's product marketed under trademark designation Sumikaron Blue-E-FBL), to produce a transparent nonfogging film colored uniformly in blue. The nonfogging article thus produced suffered absolutely no degradation of the film and, as shown in Table 1, absolutely no change occurred in the nonfogging property of the film before and after the step of coloration. In the color fastness test conducted under the light of a carbon arc lamp (in accordance with Japanese Industrial Standard L-0842-1971) (hereinafter referred to as "fade test") for the period of 200 hours, the article showed color fastness such as to permit virtually no fading.

Comparative Example 1

An ariticle of CR-39 which was coated first with an undercoat layer and then with a nonfogging overcoat film by faithfully following the procedure of Example 1, was kept at 80° C. for five minutes in a dyeing bath composed of 100 g of water and 0.2 g of an anthraquinone type disperse dye (Sumitomo Chemical's product marketed under trademark designation Sumikaron Blue-E-FBL), to produce an article having a nonfogging film colored uniformly in blue.

Although the nonfogging article suffered no degradation of the film, the fogging property was notably lower after the step of coloration than before.

EXAMPLE 2

To a circular polycarbonate plate substrate of bisphenol A type 3 mm thick and 70 mm across, a paint prepared by dissolving 100 g of a copolymer consisting of 36 g of 2-hydroxyethyl methacrylate, 14 g of dimethylaminoethyl methacrylate and 5 g of methyl methacrylate, together with 1.3 g of hexakis-methoxymethyl melamine and 0.18 g of ammonium chloride, in 900 g of ethyl Cellosolve was applied. The paint was heated at a temperature of 130° C. for 10 minutes, to produce an under coat layer. Then, a paint prepared by dissolving in 330 g of ethyl Cellosolve 50 g of 2-hydroxybisethyl methacrylate and 65 g of a prepolymer formed of 40 g of hexakis-methoxymethyl melamine and 27 g of 1,4-butane diol and adding thereto 0.2 g of ammonium thiocyanate as a catalyst was applied to the under-coat layer and set by heating at a temperature of 95° C. for 20 minutes, to produce a medium coat layer. Further, a paint prepared by dissolving 100 g of a prepolymer (molecular weight about 3,000) formed of 250 g of hexakis-methoxymethyl melamine and 800 g of polyethylene glycol of a molecular weight of 200, in 0.4 g of ammonium nitrate as a catalyst and 12 g of a polyoxyethylene alkylamide type surfactant (Lion Oils and Fats' product marketed under trademark designation Esomide 0-15), in a mixed solvent consisting of 45 g of butyl Cellosolve and 25 g of water was applied to the medium coat layer and heated at a temperature of 130° C. for 60 minutes, to produce a nonfogging film. The article of bis-phenol A type polycarbonate coated as described above with the nonfogging film was kept at 90° C. for five minutes in a dyeing bath composed of 20 g of a polyoxyethylene alkylamide type nonionic surfactant (Lion Oils and Fats' product marketed under trademark designation Esomide), 60 g of a polyoxyethylene alkylphenyl ether sulfate type anionic surfactant (Lion Oils and Fats' product containing about 60% of principal component and marketed under trademark designation Sunnol NES), 20 g of water and 4 g of a quinophthalone type disperse dye (Sumitomo Chemical's product marketed under trademark designation Sumikaron Yellow SE-3GL), to produce an article having a transparent nonfogging film colored uniformly in yellow. This nonfogging article suffered absolutely no degradation of the film and, as shown in Table 1, absolutely no change occurred in the nonfogging property of the film before and after the step of coloration. In the fade test continued for 2,000 hours, the article possessed color fastness such as to permit no fading.

Comparative Example 2

An article of bis-phenol A type polycarbonate coated with a nonfogging film by faithfully following the procedure of Example 2 was kept at a temperature of 80° C. for five minutes in a dyeing bath composed of 10 g of a polyoxyethylene alkylamide type nonionic surfactant (Lion Oils and Fats' product marketed under trademark designation Esomide 0-15), 90 g of water and 1 g of a quinophthalone type disperse dye (Sumitomo Chemical's product marketed under trademark designation Sumikaron Yellow SE-3GL), to produce an article having a nonfogging coat colored uniformly in yellow. As shown in Table 1, the fogging property of this nonfogging article was notably lower after the step of coloration than before.

EXAMPLE 3

A paint prepared by dissolving 130 g of a prepolymer obtained by the reaction of 195 g of hexakis-methoxymethyl melamine with 135 g of 1,4-butane diol and 100 g of 2-hydroxyethyl methacrylte polymer in 680 g of ethyl Cellosolve and adding to the resultant solution 1.0 g of ammonium thiocyanate as a catalyst was applied to a circular glass plate substrate 3 mm thick and 65 mm across which had undergone a pretreatment comprising the steps of immersing the substrate in a pretreating liquid prepared by dissolving 5 g of γ-glycidoxipropyl trimethoxy silane (Toray's product marketed under trademark designation Silicone SH6040) in a mixed solvent consisting of 90 g of ethanol and 10 g of water and thereafter heating the subsequently formed coat at a temperature of 130° C. for 10 minutes. The paint applied to the substrate was then set by being heated at a temperature of 100° C. for 20 minutes, to produce an under-coat layer. To this undercoat layer was applied a paint prepared by dissolving 200 g of a prepolymer formed by the polycondensation of 390 g of hexakismethoxymethyl melamine with 640 g of polyoxyethylated glycerin having a molecular weight of 320 in a mixed solvent consisting of 40 g of butyl Cellosolve and 20 g of water and adding to the resultant solution 2.0 g of ammonium nitrate as a catalyst and 20 g of a polyoxyalkyl aryl type surfactant (Lion Oils and Fats' product marketed under trademark designation Liponox NCO). The paint thus applied was heated at a temperature of 130° C. for 50 minutes, to produce a nonfogging film. The glass plate substrate coated with the nonfogging film was kept at 90° C. for five minutes in a dyeing bath composed of 75 g of an alkylmethyl tauride type anionic surfactant (Lion Oils and Fats' product marketed under trademark designation Liporan TE), 25 g of water, and 6 g of a disazo type disperse dye (Sumitomo Chemical's product marketed under trademark designation Sumika Orange SE-B), to produce a transparent article colored uniformly in orange. This nonfogging article suffered absolutely no degradation of the film and, as shown in Table 1, absolutely no change occurred in the nonfogging property of the film before and after the step of coloration. In the fade test continued for 2,000 hours, the article possessed color fastness such as to permit no fading.

EXAMPLE 4

To the opposite surfaces of a circular plate substrate 4 mm thick and 72 mm across obtained by the polymerization of diethylene glycol bis-allyl carbonate (PPG Industries' product marketed under trademark designation CR-39), a paint prepared by dissolving 100 g of 2-hydroxyethyl methacrylate polymer (molecular weight 80,000 to 100,000), 5 g of hexakismethoxymethyl melamine, 0.78 g of ammoniun chloride and 8 g of a polyoxyethylene alkyl aryl type surfactant (Kao Soap's product marketed under trademark designation Emulgen 910) in 400 g of ethylene Cellosolve was applied. The paint thus formed was heated at a temperature of 130° C. for 40 minutes to produce a nonfogging film. The article of CR-39 coated as described above with the nonfogging film was kept at 95° C. for five minutes in a dyeing bath composed of 80 g of a polyoxyalkyl ether type surfactant (Asahi Denka's product marketed under trademark designation Adekanol LO-7), 20 g of water and 7 g of an azo type-quinone type blended disperse dye (Sumitomo Chemical's product marketed under trademark designation Sumikaron Black E-B), to produce a transparent article colored uniformly in black. This nonfogging article suffered absolutely no degradation of the film and, as shown in Table 1, absolutely no change occurred in the nonfogging property of the film before and after the step of coloration. In the fade test continued for 2,000 hours, the article possessed color fastness such as to permit no fading.

EXAMPLE 5

A liquid mixture obtained by homogeneously mixing 80 g of 2-hydroxyethyl methacrylate, 10 g of acrylic acid, 10 g of polyethylene glycol dimethacrylate (the polyethylene glycol moiety having an average molecular weight of 3,100, $\overline{N}=90$) and 7 g of a polyoxyethylene-alkyl aryl ether type surfactant (Lion Oils and Fats' product marketed under trademark designation Liponox NCN) was applied to a circular acryl plate substrate 3 mm thick and 65 mm across. The coated substrate was radiated with Curetron 300 KV, 25 mA, to a total dose of 3 Mrads, to produce an acrylic plate substrate having a hydrophilic nonfogging film. The acrylic plate substrate possessing the hydrophilic nonfogging film was kept at a temperature of 90° C. for five minutes in a dyeing bath composed of 50 g of a dialkyl sulfosuccinate type surfactant (Lion Oils and Fats' product containing about 70% of principal component and marketed under trademark designation Lipal 87OS), 50 g of water and 5 g of an azo type-quinone type blended disperse dye (Sumitomo Chemical's product marketed under trademark designation Sumikaron Brown E-R), to produce an article possessing a transparent nonfogging film colored uniformly in brown. This nonfogging article suffered absolutely no degradation of the film and, as shown in Table 1, absolutely no change occurred in the nonfogging property of the film before and after the step of coloration. In the fade test continued for 2,000 hours, the article possessed color fastness such as to permit no fading.

EXAMPLE 6

To a circular glass plate substrate 2 mm thick and 65 mm across, a paint prepared by mixing 4.8 g of phenol formaldehyde resin latex (solids content 50%) (Showa Union Gosei's product marketed under trademark designation BRL 071), 0.22 g of aluminum chloride ($AlCl_3.6H_2O$) and 1 g of a polyoxyethylene alkyl ether type surfactant Asahi Denka's product marketed under trademark designation Adekatol SO145) in 50 g of an aqueous 10% polyvinyl alcohol solution having a saponification degree of 89% and a polymerization degree of 1450 was applied. The paint thus applied was dried at a temperature of 150° C. for 10 minutes to produce a glass plate substrate possessing a nonfogging film. The glass plate substrate possessing the nonfogging film was kept at a temperature of 90° C. for five minutes in a dyeing solution composed of 100 g of a dialkyl sulfosuccinate type surfactant (Daiichi Kogyo Seiyaku's product marketed under trademark designation Neocole YSK) and 5 g of an anthraquinone type disperse dye (Sumitomo Chemical's product marketed under trademark designation Sumikaron Blue E-FBL), to produce an article possessing a transparent nonfogging film colored uniformly in blue. This nonfogging article suffered absolutely no degradation of the film and, as shown in Table 1, absolutely no change occurred in the nonfogging property of the film before and after the step of coloration. In the fade test continued for 2,000 hours, the article possessed color fastness such as to permit no fading.

TABLE 1

| Example & Comparative | Breath test | | Wetting test | |
|---|---|---|---|---|
| Example No. | Before test | After test | Before test | After test |
| Example 1 | No fogging | No fogging | A | A |

TABLE 1-continued

| Example & Comparative Example No. | Breath test Before test | Breath test After test | Wetting test Before test | Wetting test After test |
|---|---|---|---|---|
| | observed | observed | | |
| Comparative Example 1 | No fogging observed | Fogging observed | A | B ~ C |
| Example 2 | No fogging observed | No fogging observed | A | A |
| Comparative Example 2 | No fogging observed | Fogging observed | A | B |
| Example 3 | No fogging observed | No fogging observed | A | A |
| Example 4 | No fogging observed | No fogging observed | A | A |
| Example 5 | No fogging observed | No fogging observed | A | A |
| Example 6 | No fogging observed | No fogging observed | A | A |

What is claimed is:

1. A method for the manufacture of a colored nonfogging article, which comprises bringing a nonfogging substrate containing a surfactant into contact with a dyeing solution containing a surfactant, a solvent and a coloring material, said surfactant being contained in the dyeing solution in an amount within the range of 20 to 100% by weight based on the total amount of the surfactant and the solvent.

2. The method according to claim 1, wherein the amount of the surfactant contained in the dyeing solution is within the range of 50 to 100% by weight based on the total amount of the surfactant and the solvent.

3. The method according to claim 2, wherein the dyeing solution is composed of a surfactant and a coloring material.

4. The method according to claim 3, wherein the dyeing solution is composed of one combination of a surfactant and a coloring material selected from the group consisting of combinations of a dialkyl sulfosuccinate type anionic surfactant and an anthraquinone type disperse dye, a polyoxyethylene alkylamide type nonionic surfactant and a quinophthalone type disperse dye, and an alkylmethyl tauride type anionic surfactant and a disazo type disperse dye.

5. The method according to claim 1, wherein the surfactant contained in the dyeing solution is at least one member selected from the group consisting of nonionic and anionic surfactants.

6. The method according to claim 1, wherein the amount of the coloring material contained in the dyeing solution is within the range of 0.01 to 50% by weight based on the total amount of the surfactant and the solvent.

7. The method according to claim 6, wherein the amount of the coloring material contained in the dyeing solution is within the range of 0.1 to 20% by weight based on the total amount of the surfactant and the solvent.

8. The method according to claim 1, wherein the nonfogging substrate contains the surfactant in an amount within 1 to 40% by weight based on the resin solids making up the substrate.

9. The method according to claim 8, wherein the surfactant contained in the nonfogging substrate is a polyoxyethylene type nonionic surfactant.

10. The method according to claim 1, wherein the nonfogging substrate is a mixture of a resin and a surfactant.

11. The method according to claim 10, wherein the nonfogging substrate is a film applied to the surface of a shaped article.

12. The method according to claim 10, wherein the nonfogging substrate constitutes an article.

13. The method according to claim 10, wherein the resin making up the nonfogging substrate is a hydrophilic resin.

14. The method according to claim 13, wherein the hydrophilic resin is a polyol-modified melamine resin.

15. The method according to claim 14, wherein the polyol-modified melamine resin is a mixture of prepolycondensate between a methylol melamine resin having at least part of methylol groups thereof alkyletherified and a polyhydric alcohol possessing an ethylene oxide chain of a molecular weight within the range of 100 to 2,000.

16. The method according to claim 1, wherein the treatment of contact between the nonfogging substrate and the dyeing solution is carried out at a temperature within the range of 40° to 130° C. for a period within the range of 10 seconds and one hour.

17. The method according to claim 16, wherein the treatment of contact between the nonfogging substrate and the dyeing solution is carried out at a temperature within the range of 70° to 95° C. for a period within the range of 1 to 20 minutes.

18. A colored nonfogging article manufactured by bringing a nonfogging substrate containing a surfactant into contact with a dyeing solution containing a surfactant, a solvent and a coloring material, said surfactant being contained in the dyeing solution in an amount within the range of 20 to 100% by weight based on the total amount of the surfactant and the solvent.

19. The article according to claim 18, which article is a lens for eyeglasses.

20. The article according to claim 18, which article is a lens for ski goggles.

* * * * *

UNITED STATES PATENT AND TRADEMARK OFFICE
CERTIFICATE OF CORRECTION

PATENT NO. : 4,310,330

DATED : January 12, 1982

INVENTOR(S) : Masaaki Funaki, Motoaki Yoshida, Haruo Inatomi, Ryozo Kuriyama and Taizo Oshima It is certified that error appears in the above—identified patent and that said Letters Patent is hereby corrected as shown below:

Col. 1, line 56; "obtianed" should read -- obtained --
Col. 2, line 65; "combiantions" should read -- combinations --
Col. 4, lines 46 & 47; "R$+$CONH$-$CH$_2$C$-$H$_2$O$+_n$H" should read -- R-CONH$+$CH$_2$CH$_2$O$+_n$H --
Col. 5, line 1; "vlaue" should read -- value --
Col. 5, line 11; "vlaue" should read -- value --
Col. 8, line 35; "poly(-" should read -- poly- -- (it is incorrectly hyphenated and the "(" should be printed on the following line)
Col. 9, line 49; "ariticle" should read -- article --
Col. 12, line 40; "Asahi" should read -- (Asahi --
Col. 12, Table 1, last line of column, "No fogging" (both occurrences) should be followed by -- observed -- (both occurrences in Col. 13, Table 1-continued)

Signed and Sealed this

Twenty-sixth Day of October 1982

[SEAL]

Attest:

Attesting Officer

GERALD J. MOSSINGHOFF

Commissioner of Patents and Trademarks